US012596838B2

(12) United States Patent
Watson et al.

(10) Patent No.: US 12,596,838 B2
(45) Date of Patent: Apr. 7, 2026

(54) METHOD AND SYSTEM FOR PERFORMING TABLE QUESTION-ANSWERING TASKS WHILE PRESERVING DATA SECURITY

(71) Applicant: JPMorgan Chase Bank, N.A., New York, NY (US)

(72) Inventors: William Watson, Long Beach, NY (US); Naan Cho, New York, NY (US); Tucker Richard Balch, Suwanee, GA (US); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 153 days.

(21) Appl. No.: 18/535,428

(22) Filed: Dec. 11, 2023

(65) Prior Publication Data

US 2025/0190617 A1 Jun. 12, 2025

(51) Int. Cl.
*G06F 21/00* (2013.01)
*G06F 21/62* (2013.01)

(52) U.S. Cl.
CPC ...... *G06F 21/6245* (2013.01); *G06F 21/6227* (2013.01)

(58) Field of Classification Search
CPC ............ G06F 21/6245; G06F 21/6227; G06F 16/258; H04L 63/10; H04W 12/02
See application file for complete search history.

(56) References Cited

U.S. PATENT DOCUMENTS

| | | | | |
|---|---|---|---|---|
| 2019/0197149 | A1* | 6/2019 | Chapin | G06F 16/258 |
| 2024/0070270 | A1* | 2/2024 | Mace | G06F 21/554 |
| 2024/0356881 | A1* | 10/2024 | Wheeler | G06F 40/40 |
| 2024/0362209 | A1* | 10/2024 | Almaer | G06F 16/2433 |

* cited by examiner

*Primary Examiner* — Yogesh Paliwal
(74) *Attorney, Agent, or Firm* — Greenblum & Bernstein, P.L.C.

(57) ABSTRACT

A method for using a large language model to perform complex table question-answering tasks while preserving data security and privacy with respect to the underlying data included in a table is provided. The method includes: receiving a user query that relates to a table; generating, based on the user query, a prompt that includes a role, at least one instruction, schema, and a question; transmitting the prompt to an external processor that does not have access to the underlying data included in the table; receiving, from the external processor, a set of executable code which has been generated by the external processor in response to the prompt and which is applicable to the table; generating an answer to the user query by executing the set of executable code; and transmitting, to the user, the answer to the user query.

16 Claims, 6 Drawing Sheets

400

Receive User Query S402

Generate Prompt with Role, Instructions, Schema, and Question S404

Transmit Prompt to External Processor
S406

Receive Executable Code Generated by External Processor
S408

Apply Executable Code to Table to Generate Answer to User Query
S410

Determine Whether Answer is Success or Failure
S412

Success: Transmit Answer to User
S414

Failure: Generate Error Message and Transmit to External Processor
S416

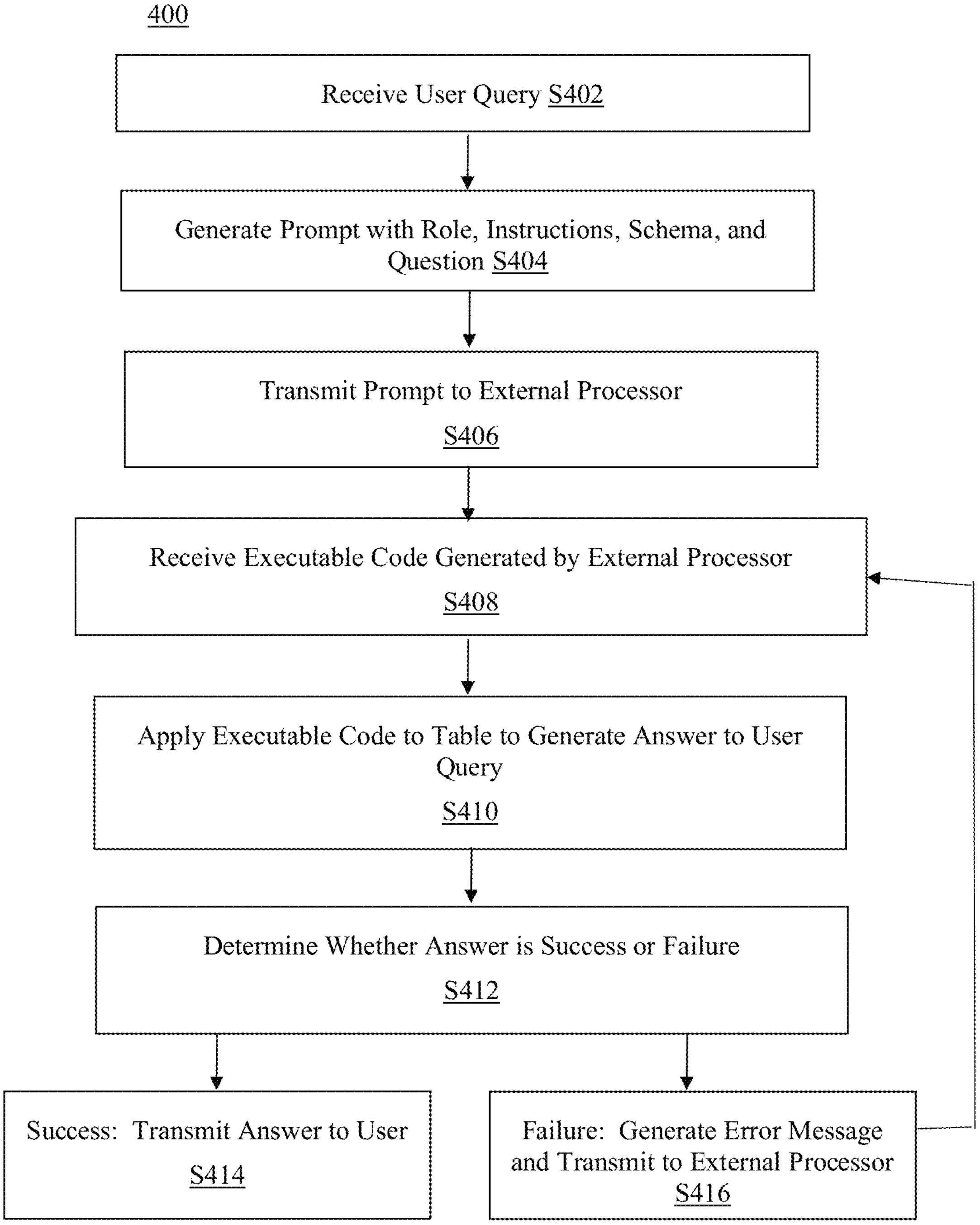

Role

" You are an AI Assistant that can answer questions from tables by writing python pandas code. "
" " You will receive a question and will have to write code to best answer it. "
" " You will only be provided the columns to the table and their types. "

Instructions

" Follow these instructions: "
" " 1) You must write python code to operate on a pandas dataframe named df "
" " 2) Use reset_index() after any groupby operation involving aggregation, and sort "
" + ... "
" " 8) If you think you cannot answer the question, look for columns such as note, comments, etc. that may contain the answer and return the correct row item "

Schema

" The table df has the following columns: company(string), ...(string), ...sales(number), asset(number) "

Query

What is the average assets in billions of the company Bank of United States of America, which has less than $49.01 billions in sales?

O(1)

O(1)

O(C)

O(1)

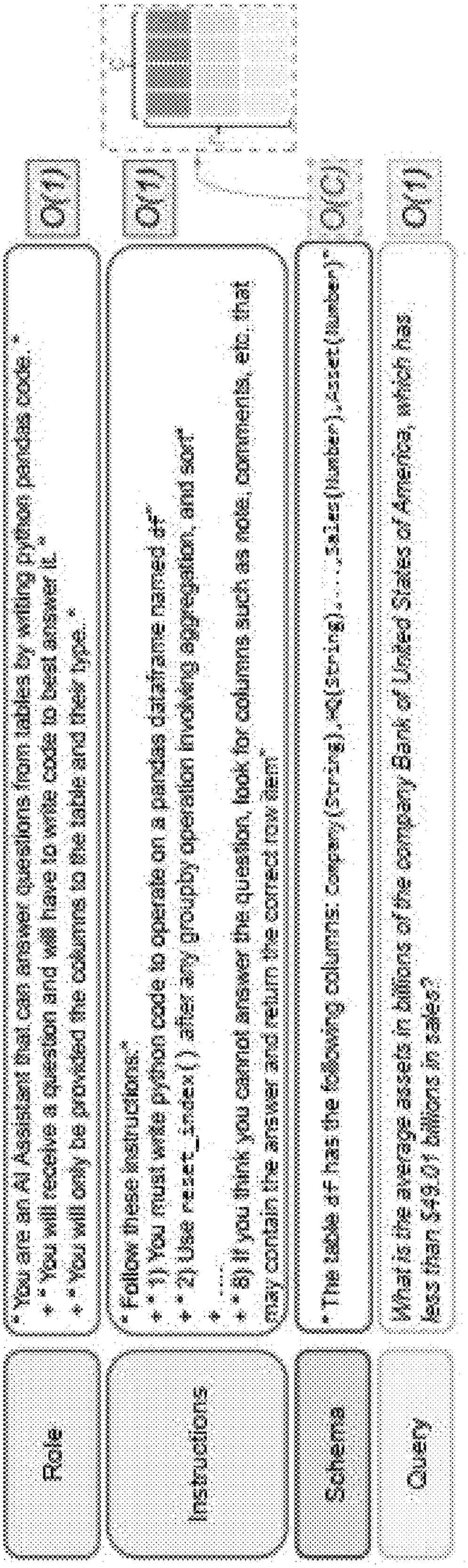

FIG. 6

METHOD AND SYSTEM FOR PERFORMING TABLE QUESTION-ANSWERING TASKS WHILE PRESERVING DATA SECURITY

BACKGROUND

1. Field of the Disclosure

This technology relates to methods and systems for using a large language model to perform complex table question-answering tasks while preserving data security and privacy with respect to the underlying data included in the table.

2. Background Information

A myriad of different Large Language Models (LLMs) face a common challenge in contextually analyzing table question-answering tasks. These challenges are engendered from 1) finite context windows for large tables, 2) multi-faceted discrepancies amongst tokenization patterns against cell boundaries, and 3) various limitations stemming from data confidentiality in the process of using external models.

Encoder-based approaches in contextually analyzing table question-answering tasks for language models typically prioritize and highlight the methods' achievements in accuracy. However, in many cases, a prerequisite for these approaches to achieve such accuracy is the exposition of tabular content in its entirety and the indulgent ingestion of tokens. Such liberal dispositions towards privacy and efficiency can be deemed as impractical in the tangible deployment process of language models within institutions. Moreover, such necessities to expose the underlying data begs the question of whether the model actually understands the question to provide an accurate answer.

Since the advent of transformer-based attention models, pre-trained language models have shown remarkable success in learning and encoding the semantics of tabular content. Methods employing encoder-based architectures rely on Masked Language Modeling (MLM) to learn semantics and dense representations of tabular content. Yet they are pre-trained on natural language text tokenized by byte-pair-encoding or WordPiece, which can misalign with tabular structure. TaPaS employed an encoder that is pre-trained with whole word masking, TaBERT leveraged Masked Column Prediction and Cell Value Recovery to learn structure, and GraPPa augmented pre-training with synthetic SQL to inject structural properties into the model. In contrast to these encoder-based approaches, TaPEx relies on a Bidirectional and Auto-Regressive Transformer (BART) encoder-decoder backbone to encode tables and generate answers in an autoregressive fashion.

Furthermore, prior work has shown that language models can more effectively solve problems when decomposing them into steps or a chain of thought. Using chain of thought through code has been demonstrated by robotic programs, action plan generation in robotics, web browsing, tool APIs, or the generation of valid programs for arithmetic computation. ReAct explores how LLMs can improve their chain of thought reasoning via intermediate actions and interactions with external sources. Furthermore, BINDER demonstrated a neural-symbolic approach to mapping questions to a program, building upon previous work for semantic parsing and code generation.

Also, previous literature has explored how LLMs can interact with themselves through intermediate follow-ups, chained LLM prompt, or cascades. Other previous work has proposed how LLMs can be encouraged to generate their own prompts for solving tasks. Finally, MemPrompt demonstrated that memories of errors and user feedback can be incorporated as part of the conversation to help prevent repetitive mistakes.

SUMMARY

The present disclosure, through one or more of its various aspects, embodiments, and/or specific features or sub-components, provides, inter alia, various systems, servers, devices, methods, media, programs, and platforms for using a large language model to perform complex table question-answering tasks while preserving data security and privacy with respect to the underlying data included in the table.

According to an aspect of the present disclosure, a method for performing a question-answering task relating to a table while preserving data security and privacy with respect to underlying data included in the table is provided. The method is implemented by a first processor. The method includes: receiving, by the first processor from a user, a user query that relates to the table; generating, by the first processor based on the user query, a prompt that includes a role, at least one instruction, schema, and a question; transmitting, by the first processor to a second processor, the prompt; receiving, by the first processor from the second processor, a first set of executable code that is applicable to the table, the first set of executable code having been generated by the second processor in response to the prompt; generating, by the first processor, an answer to the user query by executing the first set of executable code; and transmitting, by the first processor to the user, the answer to the user query.

The role may include an explanation that the second processor is an artificial intelligence assistant that is designed to answer questions from tables by generating executable code and that the second processor is provided with information that relates to columns included in the table but not provided with the underlying data included in the table.

The at least one instruction may include information indicating a type of the executable code to be generated and at least one suggestion that relates to how to overcome a potential determination by the second processor that the question is not answerable.

The schema may include information that indicates a number of columns included in the table and column header information for each of the columns included in the table.

The question may include information that relates to the user query.

The method may further include determining whether the answer to the user query corresponds to a successful retrieval of information from the table.

The successful retrieval may include at least one from among a text entry from the table, an aggregated numerical value, and a list of entries from the table.

The method may further include: determining whether the answer to the user query corresponds to a failure; and when a determination is made that the answer to the user query corresponds to the failure, generating an error message that includes at least one from among information indicating that a value error has been made, information indicating that an index error has been made, information indicating that a null answer that provides no identifiable answer and no executable code has been generated, and information indicating that the second processor has generated a comment corresponding to an inability of the second processor to generate a response to the prompt.

When the determination is made that the answer corresponds to the failure, the method may further include: transmitting the error message to the second processor; receiving, from the second processor, a second set of executable code that is applicable to the table; and generating an updated answer by executing the second set of executable code.

According to another exemplary embodiment, a computing apparatus for performing a question-answering task relating to a table while preserving data security and privacy with respect to underlying data included in the table is provided. The computing apparatus includes a first processor; a memory; and a communication interface coupled to each of the processor and the memory. The first processor is configured to: receive, from a user via the communication interface, a user query that relates to the table; generate, based on the user query, a prompt that includes a role, at least one instruction, schema, and a question; transmit, via the communication interface to an external processor that is outside of the computing apparatus, the prompt; receive, from the external processor via the communication interface, a first set of executable code that is applicable to the table, the first set of executable code having been generated by the external processor in response to the prompt; generate an answer to the user query by executing the first set of executable code; and transmit, to the user via the communication interface, the answer to the user query.

The role may include an explanation that the external processor is an artificial intelligence assistant that is designed to answer questions from tables by generating executable code and that the external processor is provided with information that relates to columns included in the table but not provided with the underlying data included in the table.

The at least one instruction may include information indicating a type of the executable code to be generated and at least one suggestion that relates to how to overcome a potential determination by the external processor that the question is not answerable.

The schema may include information that indicates a number of columns included in the table and column header information for each of the columns included in the table.

The question may include information that relates to the user query.

The first processor may be further configured to determine whether the answer to the user query corresponds to a successful retrieval of information from the table.

The successful retrieval may include at least one from among a text entry from the table, an aggregated numerical value, and a list of entries from the table.

The first processor may be further configured to: determine whether the answer to the user query corresponds to a failure; and when a determination is made that the answer to the user query corresponds to the failure, generate an error message that includes at least one from among information indicating that a value error has been made, information indicating that an index error has been made, information indicating that a null answer that provides no identifiable answer and no executable code has been generated, and information indicating that the external processor has generated a comment corresponding to an inability of the second processor to generate a response to the prompt.

When the determination is made that the answer corresponds to the failure, the first processor may be further configured to: transmit the error message to the external processor; receive, from the external processor, a second set of executable code that is applicable to the table; and generate an updated answer by executing the second set of executable code.

According to yet another exemplary embodiment, a non-transitory computer readable storage medium storing instructions for performing a question-answering task relating to a table while preserving data security and privacy with respect to underlying data included in the table is provided. The storage medium includes a first set of executable code which, when executed by a processor, causes the processor to: receive, from a user, a user query that relates to the table; generate, based on the user query, a prompt that includes a role, at least one instruction, schema, and a question; transmit, to a second processor, the prompt; receive, from the second processor, a second set of executable code that is applicable to the table, the second set of executable code having been generated by the second processor in response to the prompt; generate an answer to the user query by executing the second set of executable code; and transmit, to the user, the answer to the user query.

The role may include an explanation that the second processor is an artificial intelligence assistant that is designed to answer questions from tables by generating executable code and that the second processor is provided with information that relates to columns included in the table but not provided with the underlying data included in the table.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for implementing a method for using a large language model to perform complex table question-answering tasks while preserving data security and privacy with respect to the underlying data included in the table.

FIG. 6 is a diagram that illustrates an outline of a Role, Instructions, Schema, and Question (RISQ) prompt template that the Oracle component generates for the Solver component in an execution of a method for using a large language model to perform complex table question-answering tasks while preserving data security and privacy with respect to the underlying data included in the table, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
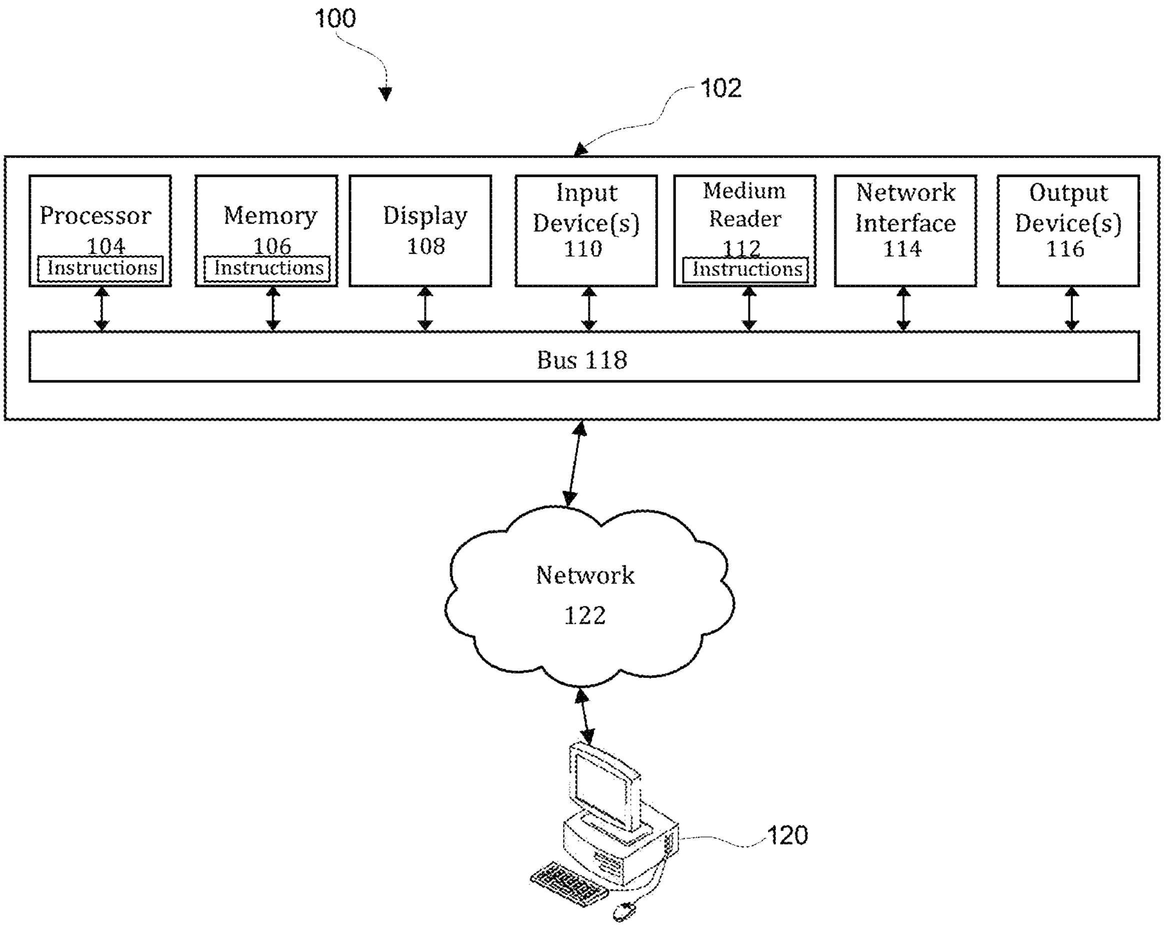
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning system (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using a large language model to perform complex table question-answering tasks while preserving data security and privacy with respect to the underlying data included in the table.

Figure 2:
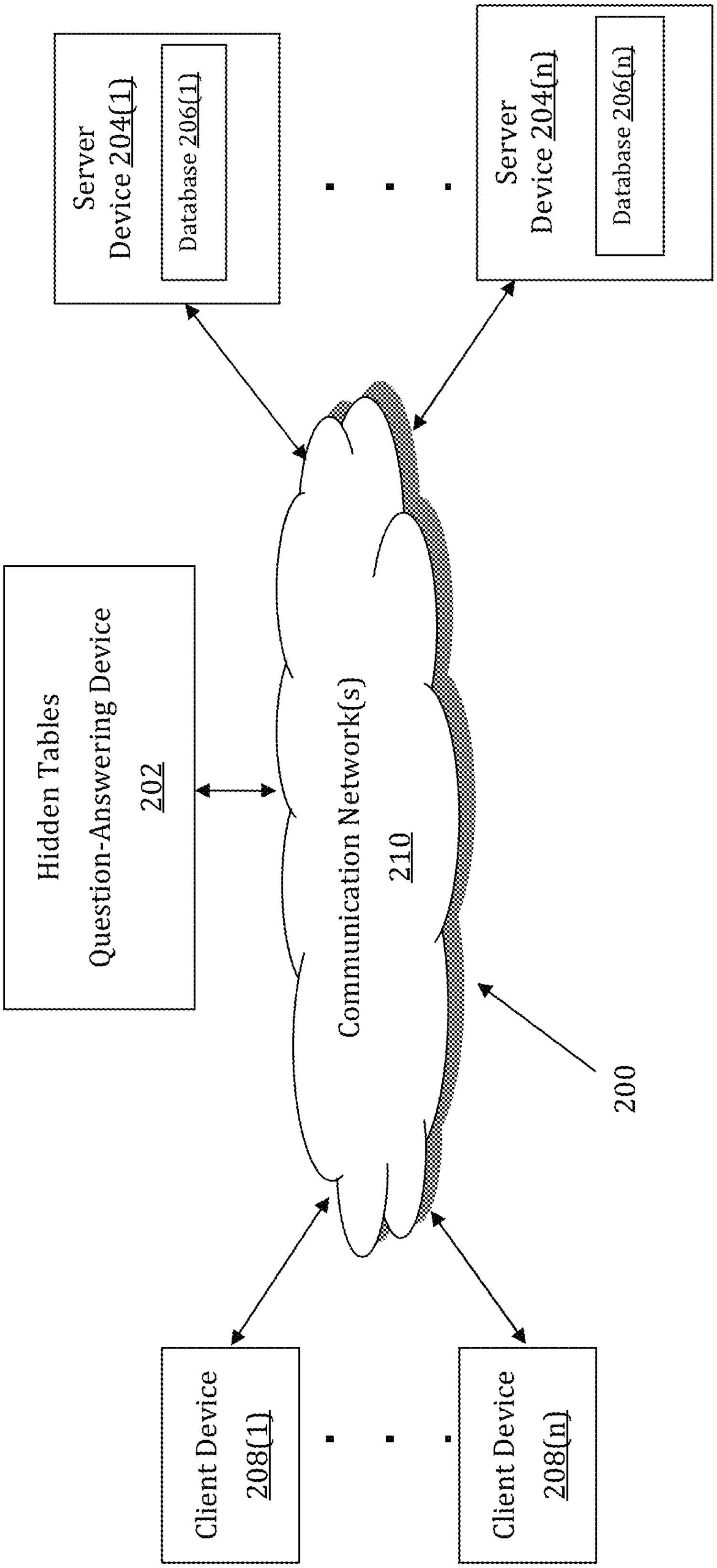
FIG. 2 illustrates an exemplary diagram of a network environment.

Referring to FIG. 2, a schematic of an exemplary network environment 200 for implementing a method for using a large language model to perform complex table question-answering tasks while preserving data security and privacy with respect to the underlying data included in the table is illustrated. In an exemplary embodiment, the method is executable on any networked computer platform, such as, for example, a personal computer (PC).

The method for using a large language model to perform complex table question-answering tasks while preserving data security and privacy with respect to the underlying data included in the table may be implemented by a Hidden Tables Question-Answering (HTQA) device 202. The HTQA device 202 may be the same or similar to the computer system 102 as described with respect to FIG. 1. The HTQA device 202 may store one or more applications that can include executable instructions that, when executed by the HTQA device 202, cause the HTQA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the HTQA device 202 itself, may be located in virtual server(s) running in a cloud-based computing environment rather than being tied to one or more specific physical network computing devices. Also, the application(s) may be running in one or more virtual machines (VMs) executing on the HTQA device 202. Additionally, in one or more embodiments of this technology, virtual machine(s) running on the HTQA device 202 may be managed or supervised by a hypervisor.

In the network environment 200 of FIG. 2, the HTQA device 202 is coupled to a plurality of server devices 204(1)-204(*n*) that hosts a plurality of databases 206(1)-206(*n*), and also to a plurality of client devices 208(1)-208(*n*) via communication network(s) 210. A communication interface of the HTQA device 202, such as the network interface 114 of the computer system 102 of FIG. 1, operatively couples and communicates between the HTQA device 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the HTQA device 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and HTQA devices that efficiently implement a method for using a large language model to perform complex table question-answering tasks while preserving data security and privacy with respect to the underlying data included in the table.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The HTQA device 202 may be a standalone device or integrated with one or more other devices or apparatuses, such as one or more of the server devices 204(1)-204(*n*), for example. In one particular example, the HTQA device 202 may include or be hosted by one of the server devices 204(1)-204(*n*), and other arrangements are also possible. Moreover, one or more of the devices of the HTQA device 202 may be in a same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the HTQA device 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store various types of data.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the HTQA device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the HTQA device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the HTQA device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the HTQA device 202, the server devices 204(1)-204(*n*), or the client devices 208(1)-208(*n*), for example, may be configured to operate as virtual instances on the same physical machine. In other words, one or more of the HTQA device 202, the server devices 204(1)-204(*n*), or the client devices 208(1)-208(*n*) may operate on the same physical device rather than as separate devices communicating through communication network(s) 210. Additionally, there may be more or fewer HTQA devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
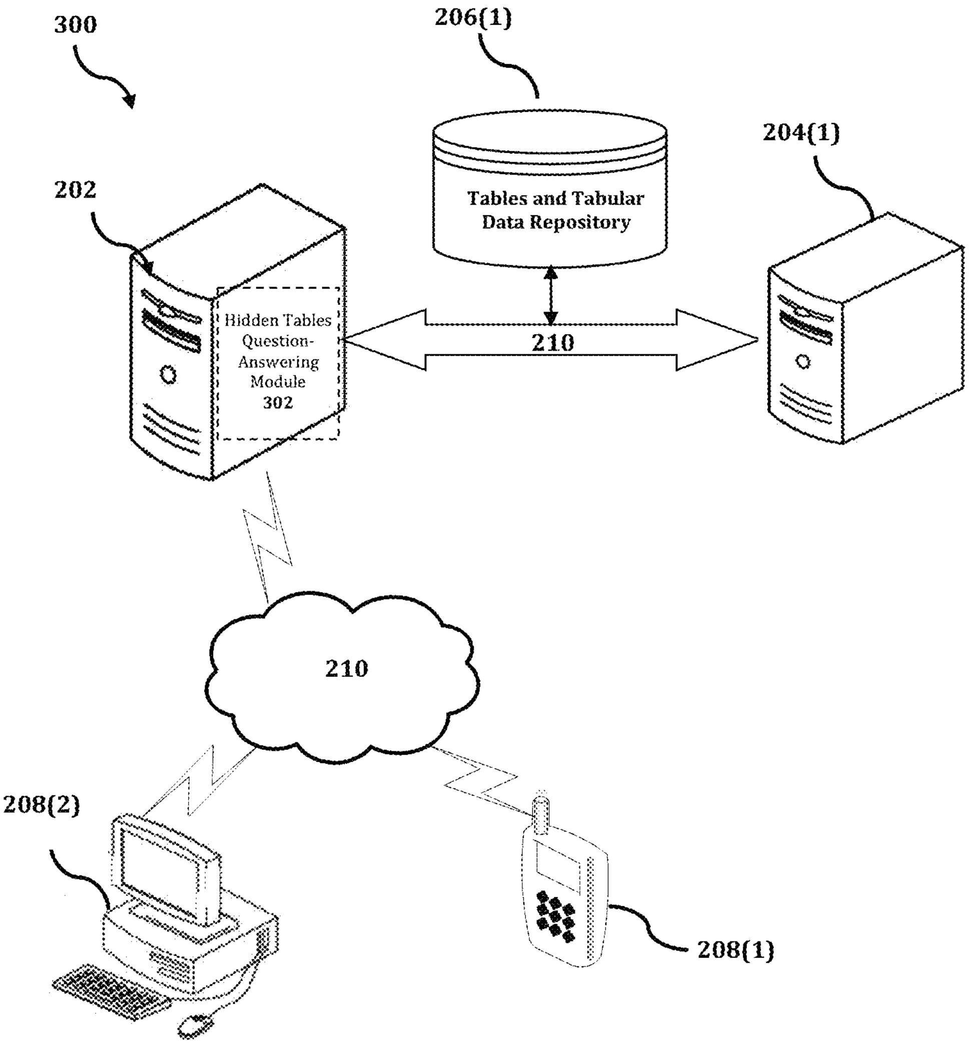
FIG. 3 shows an exemplary system for implementing a method for using a large language model to perform complex table question-answering tasks while preserving data security and privacy with respect to the underlying data included in the table.

The HTQA device 202 is described and illustrated in FIG. 3 as including a hidden tables question-answering module 302, although it may include other rules, policies, modules, databases, or applications, for example. As will be described below, the hidden tables question-answering module 302 is configured to implement a method for using a large language model to perform complex table question-answering tasks while preserving data security and privacy with respect to the underlying data included in the table.

An exemplary process 300 for implementing a mechanism for using a large language model to perform complex table question-answering tasks while preserving data security and privacy with respect to the underlying data included in the table by utilizing the network environment of FIG. 2 is illustrated as being executed in FIG. 3. Specifically, a first client device 208(1) and a second client device 208(2) are illustrated as being in communication with HTQA device 202. In this regard, the first client device 208(1) and the second client device 208(2) may be "clients" of the HTQA device 202 and are described herein as such. Nevertheless, it is to be known and understood that the first client device 208(1) and/or the second client device 208(2) need not necessarily be "clients" of the HTQA device 202, or any entity described in association therewith herein. Any additional or alternative relationship may exist between either or both of the first client device 208(1) and the second client device 208(2) and the HTQA device 202, or no relationship may exist.

Further, HTQA device 202 is illustrated as being able to access a tables and tabular data repository 206(1). The hidden tables question-answering module 302 may be configured to access this database for implementing a method for using a large language model to perform complex table question-answering tasks while preserving data security and privacy with respect to the underlying data included in the table.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the HTQA device 202 via broadband or cellular communication. Of course, these embodiments are merely exemplary and are not limiting or exhaustive.

Upon being started, the hidden tables question-answering module 302 executes a process for using a large language model to perform complex table question-answering tasks while preserving data security and privacy with respect to the underlying data included in the table. An exemplary process for using a large language model to perform complex table question-answering tasks while preserving data security and privacy with respect to the underlying data included in the table is generally indicated at flowchart 400 in FIG. 4.

In process 400 of FIG. 4, at step S402, the hidden tables question-answering module 302 receives a user query from a user. The user query relates to a table that may have a large amount of underlying data. Then, at step S404, the hidden tables question-answering module 302 generates a prompt that is designed to guide an external processor to generate executable code that is applicable to the table so as to obtain an answer to the user query without exposing the underlying tabular data to the external processor.

In an exemplary embodiment, the prompt includes a role, one or more instructions, schema, and a question. In an exemplary embodiment, the role includes an explanation that the external processor is an artificial intelligence (AI) assistant that is designed to answer questions from tables by generating executable code and that the external processor is provided with information about the columns included in the table, but that the external processor is not provided with the underlying data included in the table.

In an exemplary embodiment, the instructions include information indicating a type of executable code to be generated, such as, for example, Structured Query Language (SQL) code or Python code, and one or more suggestions regarding how to overcome a potential determination by the external processor that the question is not answerable. In an exemplary embodiment, the schema includes information that indicates a number of columns included in the table and information about each of the column headers. In an exemplary embodiment, the question includes information that relates to the user query, such as, for example, the user query itself.

At step S406, the hidden tables question-answering module 302 transmits the prompt to the external processor. In response to receiving the prompt, the external processor generates a first set of executable code that is applicable to the table, and then, at step S408, the hidden tables question-answering module 302 receives the first set of executable code from the external processor.

At step S410, the hidden tables question-answering module 302 applies the first set of executable code to the table in order to generate an answer to the user query. Then, at step S412, the hidden tables question-answering module 302 determines whether the answer generated in step S410 represents a successful retrieval of information from the table or a failure. In an exemplary embodiment, a successful retrieval may include any one or more of a text entry from the table, an aggregated numerical value, and/or a list of entries from the table. When a determination is made that the answer is a success, then at step S414, the hidden tables question-answering module 302 transmits the answer to the user.

When a determination is made that the answer generated in step S410 corresponds to a failure to satisfactorily respond to the user query, then at step S416, the hidden tables question-answering module 302 generates an error message and transmits the error message to the external processor. In an exemplary embodiment, the error message includes any one or more of information indicating that a value error has been made, information indicating that an index error has been made, information indicating that a null answer that provides no identifiable answer and no executable code has been generated, and information indicating that the external processor has generated a comment corresponding to an inability of the external processor to generate a response to the prompt.

When the error message is transmitted to the external processor, the process 400 returns to step S408, and the external processor uses the error message to generate a new set of executable code, which is then transmitted to the hidden tables question-answering module 302. Steps S410 and S412 are then repeated based on the new set of executable code. In an exemplary embodiment, this cycle may repeat until a successful answer is generated, or there may be an upper limit, e.g., seven (7) cycles, after which the process is aborted without a successful answer.

In an exemplary embodiment, a myriad of different Large Language Models (LLMs) face a common challenge in contextually analyzing table question-answering (hereinafter referred to as "Table QA") tasks. These challenges are engendered from 1) finite context windows for large tables, 2) multi-faceted discrepancies amongst tokenization patterns against cell boundaries, and 3) various limitations stemming from data confidentiality in the process of using external models such as gpt-3.5-turbo. In response to this challenge, the present inventive concept envisions a cooperative multi-agent game dubbed "HiddenTables" as a potential resolution to this challenge. In essence, HiddenTables is played between the code-generating LLM "Solver" agent and the "Oracle" agent which evaluates the ability of the LLM agents to solve Table QA tasks. This game is based on natural language schemas and importantly, ensures the security of the underlying data. Unlike encoder-based models, HiddenTables is not limited by the number of rows in the table, and as a result, there is an improvement in efficiency in prompt and completion tokens. The infrastructure of the present inventive concept has spawned a new dataset referred to herein as "PyQTax" that spans across 116,671 question-table-answer triplets and provides additional fine-grained breakdowns and labels for varying question taxonomies. Therefore, HiddenTables is a tactile manifestation of how LLMs can interact with massive datasets while ensuring data security and minimizing generation costs.

In an exemplary embodiment, HiddenTables includes two agents: an "Oracle" and a "Solver", in which the latter generates code to answer user queries relying solely on the Oracle's instructions and relaying of schema. In this aspect, the game is played without the Solver knowing the tabular content. The Solver's code is then evaluated by the secure Oracle that relays the answer to the user or asks follow-up questions to the Solver.

Figure 5:
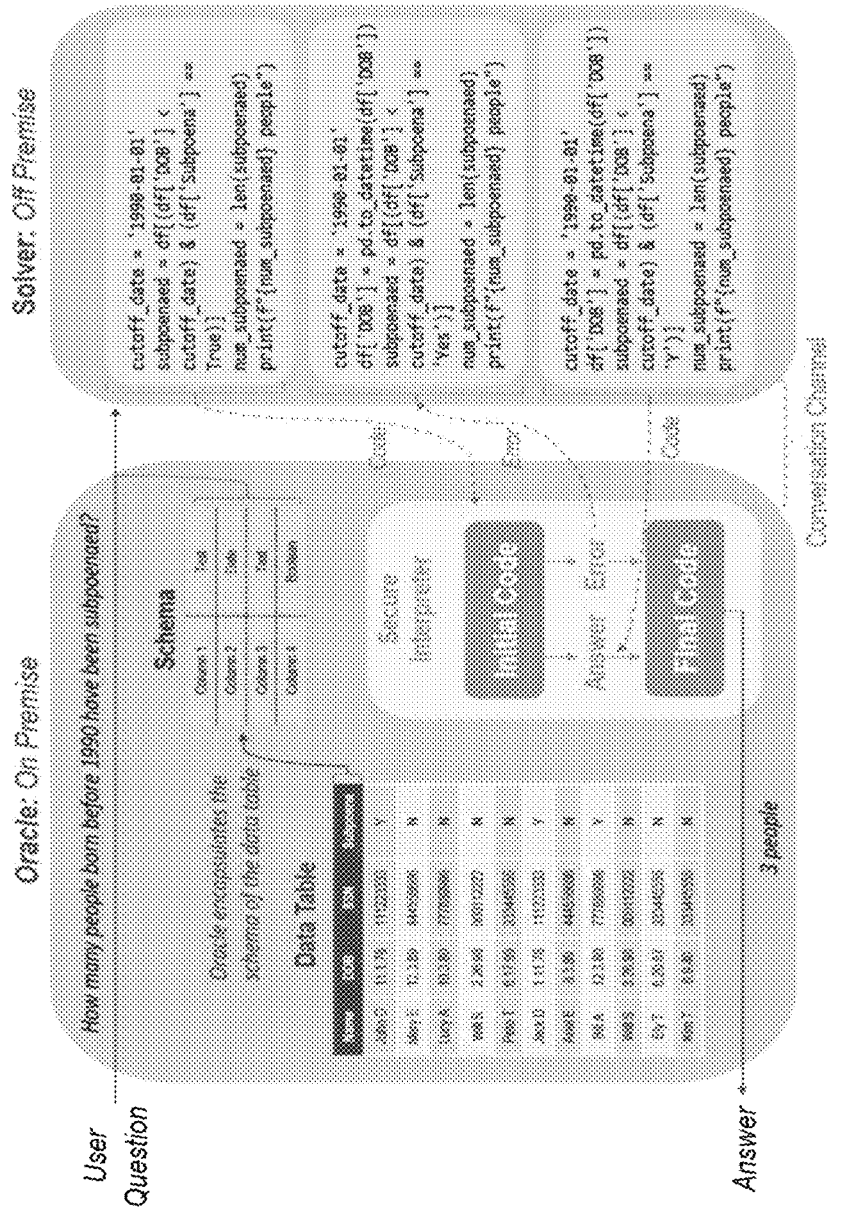
FIG. 5 is a diagram that illustrates a system overview that includes an Oracle component and a Solver component for an execution of a method for using a large language model to perform complex table question-answering tasks while preserving data security and privacy with respect to the underlying data included in the table, according to an exemplary embodiment.

FIG. 5 is a diagram 500 that illustrates a system overview that includes an Oracle component and a Solver component for an execution of a method for using a large language model to perform complex table question-answering tasks while preserving data security and privacy with respect to the underlying data included in the table, according to an exemplary embodiment. The diagram 500 summarizes the environmental set-up that the method enables between a user and an LLM known as gpt-3.5-turbo, which is encompassed in the Solver.

In an exemplary embodiment, the proposed framework is inspired from the "Chinese room argument", i.e., to what extent could language models truly comprehend natural language and align language to the correct solution when only given the table schema? In HiddenTables, two agents exist: the Oracle and the Solver. The clear delineation between the respective roles of these two agents not only allows the user to test the holistic ability of the model to comprehend tabular content, but also enables the preservation of privacy with regards to the underlying data on-premise. In this context, the proposed apparatus allows the two agents to engage in a conversation, in which the Oracle may ask questions and the Solver will generate code that could solve the Oracle's question. Next, the Oracle evaluates and follows up, which enables the Solver to correct any mistakes or misunderstandings. In an exemplary embodiment, this game is played for a maximum of seven rounds to prevent infinite cycles between the agents. Throughout this process, no data entries are exposed to the Solver; the Solver must produce executable code relying solely on the schema and the set of instructions.

In an exemplary embodiment, the Oracle takes the user query and crafts an appropriate prompt for the Solver, which is structured as a role, instruction, relevant schema, and the question. It will not expose any individual data entries in the table. This allows the Oracle to protect highly confidential information in a firewalled system from any adversaries. This prompt is then sent to the Solver. FIG. 6 is a diagram 600 that illustrates an outline of a Role, Instructions, Schema, and Question (RISQ) prompt template that the Oracle generates for the Solver in an execution of a method for using a large language model to perform complex table question-answering tasks while preserving data security and privacy with respect to the underlying data included in the table, according to an exemplary embodiment.

The Oracle also maintains a data lake in a Secure Interpreter, that executes the code produced by the Solver. Moreover, the Secure Interpreter ensures that any request to expose the dataset via code injections is rejected and that it only returns the answer to the user's query.

In an exemplary embodiment, the Solver is a code-generating LLM agent that accepts the Oracle's instructions, question, and tabular schema. Then, the Solver strives to translate and align the prompt into a sequence of executable operators that can be applied to the hidden table. In conventional systems, the main choice of query language has typically been SQL; however, in an exemplary embodiment, the Solver does not need to be restricted to any specific programming language. In one exemplary embodiment, HiddenTables opted to use Python as the Solver's language of choice, as it is dynamically typed, easily readable, and procedure-oriented. Therefore, it is convenient to view the chain-of-thought through iterative commands. Finally, byproducts of generative experiments have yielded an amalgamation of verified Python programs grounded to each question-table-answer triplet that are linked to varying taxonomies. This new dataset is referred to herein as PyQTax.

The Conversation: In an exemplary embodiment, there is a communication channel between the two agents. Foremost, the Oracle sends the instructions to the Solver. The instructions are an itemized list that dictates the format of the Solver's response. The instructions and rationale are outlined in diagram 600 in FIG. 6.

Next, the Solver responds with what it deems to be the best sequence of commands to answer the query. This is sent to the Oracle as free text along with embedded code, including artifacts pertaining to explanations and chain of thought. Consequently, the Oracle sets up a secure environment, locally fire-walled with its dataset. As described above, this environment ensures that any arbitrary execution of code is non-destructive and any exposure of the underlying tabular data is disabled.

As a result of this conversation, there are two states that are defined in detail-a state of "successful retrieval" and a state of "failure". A state of successful retrieval is defined as one in which an answer has been generated from executing the Solver's code in the Oracle's secure environment. This answer could be a text entry from the table, an aggregated value such as sum, or a list of table entries. In contrast, a state of failure is defined as an error message, such as Value or Index errors, NULL answers that provide no identifiable answer, i.e., empty data frames, nor any executable code, or the Solver's comment that it cannot answer.

For each type of failure, the Oracle handles the state differently. Firstly, errors can be sanitized to remove any data references and fed back to the Solver. Secondly, empty data frames can be conveniently identified with the Solver being informed that the generated code produced no valid results. Thirdly, if the Solver is conservative in answering the question and provides no executable code, the Oracle reassures the Solver that the question can be answered from the table provided. Within this context, new failures can be re-prompted to the Solver for correction by the Oracle.

The Oracle can generate a feedback message that is specific to the Solver's response, or provide a generic response. Therefore, the Oracle can provide automated feedback to the Solver, as both agents attempt to discover the correct answer through iterative attempts.

In an exemplary embodiment, with this apparatus to correct initial failures while retaining the original context throughout the conversation session, the Oracle and Solver are permitted to interact for a maximum of seven times before the conversation is halted and the final verdict for this query is designated as a failure. It has been discovered that failures are common when the answer is within an extractive span in a single table cell, i.e., free text, or if the answer resides in a generic column such as "comments" or "notes" that complicates contextual inference. By engaging in this apparatus to correct failures, the Oracle provides guidance tailored to the situation, while the Solver attempts to discover the underlying format of the hidden table or data. This improves the Solver's understanding of its error for the next interaction cycle.

Minor Roles—The User: The user's query initiates the game of HiddenTables. Data Lake: The Oracle has read-access to a data lake, which stores the tables and entries in a secured environment on-premise. Firewall: This is a boundary to denote in FIG. 5, i.e., the on-premise and off-premise environments in which the agents operate. This setup can enable guided entry into the on-premise environment.

Benefits of Demarcating the Roles: Demarcating the boundaries between the Oracle and Solver is done in order to ensure that the underlying dataset is protected. This can be beneficial because firstly, for many institutions that handle sensitive or confidential data such as personally identifiable information, the Oracle can prevent any off-premise entities from accessing the data but still help generate answers. Secondly, this demarcation ensures that code is executed in a regulated and structured manner, regardless of the user's location or device. Thirdly, an additional layer of control has been generated, while still allowing third-party API providers to operate on the data.

Privacy: Since row entries are omitted and safe guarded by the Oracle, the Solver must form a general solution from the schema only. More importantly, the Oracle can be configured with additional safety prompts and code policies to ensure that any adversarial attacks by the Solver are properly handled. However, in an exemplary embodiment, there may be a potential need for additional safeguards against side-channel attacks to obfuscate successful retrievals from failures.

Prompt Burden: In an exemplary embodiment, given the replacement of table entries with the RISQ system prompt, an analysis of the distribution of usage tokens for three datasets has been performed. Of the 116,661 samples accepted by the Solver and responded to without error, the average prompt burden was 279 tokens with a standard deviation of 19 tokens. The minimum, median, and maximum prompt usage was 243, 275, and 630, respectively. Overall, the total amount of tokens used in the Solver's system prompt was 32,546,634. This is only 48.5% of the burden incurred by using the entire table. In an exemplary embodiment, the construct is efficient for large tables with many rows, as the token burden remains constant for each new row of data. The Solver generated an average 115 tokens per answer, with a standard deviation of 61 tokens.

PyQTax: In an exemplary embodiment, HiddenTables has produced PyQTax that aligns 116,671 question-table-answer triplets to Python code. In addition, PyQTax categorizes every question into varying taxonomies, such as difficulty, table size, question type, operator, and sequence length. Further research may be conducted into bolstering low-performing taxonomies and improving LLM code generalization in Hidden Tables with Python.

Referring again to FIG. 5, diagram 500 illustrates an example of how HiddenTables works. The Oracle is on premise and has access to a data table, which the Oracle uses to encapsulate the schema of the data table. The Oracle receives a question from a user, which in this example is the question "How many people born before 1990 have been subpoenaed?". The Oracle also encompasses a Secure Interpreter which is used to receive initial code, generate an answer to the question, determine whether the answer corresponds to a successful retrieval of information from the data table or whether the answer corresponds to a failure, and when successful, to transmit the answer to the user.

The Solver is off premise and does not have access to the data table. The Solver receives a prompt from the Oracle and uses the prompt to generate executable code that is designed to generate an answer to the user question. The communication between the Oracle and the Solver is conducted via a "conversation channel". In the event that the initial code generated by the Solver is determined as being a failure, the Oracle sends an error message to the Solver, thereby effectively requesting that the Solver generate an updated version of the executable code in an attempt to facilitate a successful retrieval from the data table. Lastly, when the executable code is determined as being successful, the Oracle executes the code with respect to the data table in order to generate an answer to the user question, which in this example is "3 people".

Referring again to FIG. 6, diagram 600 illustrates an example of a RISQ prompt. In this example, the prompt includes a Role that notifies the Solver that "You are an AI assistant that can answer questions from tables by writing python pandas code"; that "You will receive a question and will have to write code to best answer it"; and that "You will only be provided the columns to the table and their type". The prompt also includes instructions, including the following: "Follow these instructions"; "You must write python code to operate on a pandas dataframe named df"; "Use reset_index ( ) after any group by operation involving aggregation, and sort"; and "If you think you cannot answer the question, look for columns such as note, comments, etc. that may contain the answer and return the correct row item". The prompt also includes schema, which in this example includes the following: "The table df has the following columns: Company (String), HQ (String), . . . Sales (Number), Asset (Number)". The prompt also includes a query, which in this example includes the following: "What is the average assets in billions of the company Bank of the United States of America, which has less than $49.01 billions in sales?".

Accordingly, with this technology, a process for using a large language model to perform complex table question-answering tasks while preserving data security and privacy with respect to the underlying data included in the table is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for performing a question-answering task relating to a table while preserving data security and privacy with respect to underlying data included in the table, the method being implemented by a first processor, the method comprising:

receiving, by the first processor residing in a first network from a user, a user query that relates to the table;

generating, by the first processor based on the user query, a prompt that includes a role, at least one instruction, schema, and a question, wherein the prompt is structured to guide a second processor residing on a second network that is outside of the first network to generate an executable code that is applicable to the table, and wherein the prompt dictates a format of a response to the prompt;

transmitting, by the first processor of the first network to the second processor of the second network that is external to the first network, the prompt;

receiving, by the first processor from the second processor, a first set of executable code that is applicable to the table, the first set of executable code having been generated by the second processor in response to the prompt, wherein the second processor generates the first set of executable code without knowledge of tabular content of the table for preserving data security and privacy with respect to the underlying data included in the table, and wherein the second processor specifies a sequence of commands for the generating of the first set of executable code in response to the prompt;

evaluating, by the first processor, the first set of executable code;

in response to the evaluating, generating, by the first processor, a follow-up prompt for modification of the first set of executable code;

transmitting, from the first processor and to the second processor, the follow-up prompt;

modifying, by the second processor, the first set of executable code based on the follow-up prompt;

generating, by the first processor, an answer to the user query by executing the modified first set of executable code; and transmitting, by the first processor to the user, the answer to the user query.

2. The method of claim 1, wherein the role includes an explanation that the second processor is an artificial intelligence assistant that is designed to answer questions from tables by generating executable code and that the second processor is provided with information that relates to columns included in the table but not provided with the underlying data included in the table.

3. The method of claim 1, wherein the at least one instruction includes information indicating a type of the executable code to be generated and at least one suggestion that relates to how to overcome a potential determination by the second processor that the question is not answerable.

4. The method of claim 1, wherein the schema includes information that indicates a number of columns included in the table and column header information for each of the columns included in the table.

5. The method of claim 1, wherein the question includes information that relates to the user query.

6. The method of claim 1, further comprising determining whether the answer to the user query corresponds to a successful retrieval of information from the table.

7. The method of claim 6, wherein the successful retrieval includes at least one from among a text entry from the table, an aggregated numerical value, and a list of entries from the table.

8. A computing system for performing a question-answering task relating to a table while preserving data security and privacy with respect to underlying data included in the table, the computing system comprising:

a first processor residing on a first network;

a second processor residing on a second network that is outside of the first network;

a memory; and a communication interface coupled to each of the first processor and the memory, wherein the first processor is configured to:

receive, from a user via the communication interface, a user query that relates to the table;

generate, based on the user query, a prompt that includes a role, at least one instruction, schema, and a question, wherein the prompt is structured to guide a second processor residing outside of a first network to generate an executable code that is applicable to the table, and wherein the prompt dictates a format of a response to the prompt;

transmit, via the communication interface to the second processor of the second network that is external to the first network, the prompt;

receive, from the external processor via the communication interface, a first set of executable code that is applicable to the table, the first set of executable code having been generated by the external processor in response to the prompt;

wherein the second processor generates the first set of executable code without knowledge of tabular content of the table for preserving data security and privacy with respect to the underlying data included in the table, and wherein the second processor specifies a sequence of commands for the generating of the first set of executable code in response to the prompt;

evaluate the first set of executable code;

in response to the evaluation, generate a follow-up prompt for modification of the first set of executable code;

transmit, to the second processor, the follow-up prompt;

modify, by the second processor, the first set of executable code based on the follow-up prompt;

generate an answer to the user query by executing the modified first set of executable code; and transmit, to the user via the communication interface, the answer to the user query.

9. The computing apparatus of claim 8, wherein the role includes an explanation that the external processor is an artificial intelligence assistant that is designed to answer questions from tables by generating executable code and that the external processor is provided with information that relates to columns included in the table but not provided with the underlying data included in the table.

10. The computing apparatus of claim 8, wherein the at least one instruction includes information indicating a type of the executable code to be generated and at least one suggestion that relates to how to overcome a potential determination by the external processor that the question is not answerable.

11. The computing apparatus of claim 8, wherein the schema includes information that indicates a number of columns included in the table and column header information for each of the columns included in the table.

12. The computing apparatus of claim 8, wherein the question includes information that relates to the user query.

13. The computing apparatus of claim 8, wherein the first processor is further configured to determine whether the answer to the user query corresponds to a successful retrieval of information from the table.

14. The computing apparatus of claim 13, wherein the successful retrieval includes at least one from among a text entry from the table, an aggregated numerical value, and a list of entries from the table.

15. A non-transitory computer readable storage medium storing instructions for performing a question-answering task relating to a table while preserving data security and privacy with respect to underlying data included in the table, the storage medium comprising a first set of executable code which, when executed by a first processor residing on a first network, causes the first processor to:

receive, from a user, a user query that relates to the table;

generate, based on the user query, a prompt that includes a role, at least one instruction, schema, and a question, wherein the prompt is structured to guide a second processor residing on a second network that is outside of the first network to generate an executable code that is applicable to the table, and wherein the prompt dictates a format of a response to the prompt;

transmit, to the second processor of the second network that is external to the first network, the prompt;

receive, from the second processor, a second set of executable code that is applicable to the table, the second set of executable code having been generated by the second processor in response to the prompt, wherein the second processor generates the first set of executable code without knowledge of tabular content of the table for preserving data security and privacy with respect to the underlying data included in the table, and wherein the second processor specifies a sequence of commands for the generating of the first set of executable code in response to the prompt;

evaluate the first set of executable code;

in response to the evaluation, generate a follow-up prompt for modification of the first set of executable code;

transmit, to the second processor, the follow-up prompt;

modify, by the second processor, the first set of executable code based on the follow-up prompt;

generate an answer to the user query by executing the modified first set of executable code; and transmit, to the user, the answer to the user query.

16. The non-transitory computer readable storage medium of claim 15, wherein the role includes an explanation that the second processor is an artificial intelligence assistant that is designed to answer questions from tables by generating executable code and that the second processor is provided with information that relates to columns included in the table but not provided with the underlying data included in the table.

* * * * *